(12) United States Patent
Kataoka et al.

(10) Patent No.: US 7,370,743 B2
(45) Date of Patent: May 13, 2008

(54) POWER TRANSMITTING APPARATUS

(75) Inventors: Makoto Kataoka, Shizuoka (JP);
Satoru Kashiwagi, Shizuoka (JP);
Shunichi Itou, Shizuoka (JP)

(73) Assignee: Kabushiki Kaisha F.C.C. (JP)

( * ) Notice: Subject to any disclaimer, the term of this patent is extended or adjusted under 35 U.S.C. 154(b) by 249 days.

(21) Appl. No.: 11/269,191

(22) Filed: Nov. 8, 2005

(65) Prior Publication Data

US 2006/0096829 A1    May 11, 2006

(30) Foreign Application Priority Data

Nov. 9, 2004   (JP) .............................. 2004-325288

(51) Int. Cl.
*F16D 13/54*    (2006.01)

(52) U.S. Cl. ................... 192/70.23; 192/93 A; 192/96

(58) Field of Classification Search ............. 192/70.23, 192/89.26, 89.21, 54.5
See application file for complete search history.

(56) References Cited

U.S. PATENT DOCUMENTS 2,351,996 A * 6/1944 Morgan ..................... 192/54.5
4,732,251 A * 3/1988 Tipton ..................... 192/70.24

FOREIGN PATENT DOCUMENTS

EP          1 058 018 A2    12/2000

\* cited by examiner

*Primary Examiner*—Rodney H. Bonck
*Assistant Examiner*—Edwin A Young
(74) *Attorney, Agent, or Firm*—Harness, Dickey & Pierce, P.L.C.

(57) ABSTRACT

A power transmitting apparatus has a clutch housing (2). A clutch member (4), connected to an output member (3), has a plurality of driven clutch plates (7) alternately arranged between driving clutch plates (6) of the clutch housing (2). A rotational force, inputted to the input member (1), can be transmitted to or cut-off from the output member (3) via pressure-contact or release between the driving clutch plates (6) and driven clutch plates (7). Pressure-contact assist cams and back-torque limiting cams are formed on a pressure plate 5 and the clutch member 4. The gradient angle ($\alpha2$) of the back-torque limiting cams is formed larger than the gradient angle ($\alpha1$) of the pressure-contact assisting cams.

5 Claims, 2 Drawing Sheets

POWER TRANSMITTING APPARATUS

CROSS-REFERENCE TO RELATED APPLICATION

This application claims priority to Japanese Patent Application No. 2004-325288, filed Nov. 9, 2004, which application is herein expressly incorporated by reference.

FIELD OF THE INVENTION

The present invention relates to a power transmitting apparatus for arbitrarily transmitting or cutting-off a rotational force of an input member to or from an output member.

BACKGROUND OF THE INVENTION

In general, vehicle power transmission apparatus generally uses so-called multiple disk clutches to arbitrarily transmit or cut off power of an engine to or from the vehicle wheels. In such a power transmitting apparatus, it has an input member connected to an engine side, an output member connected to a driven side, and a clutch member connected to the output member. The power can be transmitted by pressure-contacting a plurality of driving clutch plates, mounted on the input member, with a plurality of driven clutch plates, mounted on the clutch member. The power can be cut off by releasing the pressure-contacting force between the driving and driven clutch plates.

The prior art (e.g. European Laid-open Patent Specification No. 1058018) discloses technology which provides cams to add a pressure-contact assist function to improve the pressure-contacting force of both the driving and driven clutch plates during power transmission. Also, they provide a back-torque limiting function to release the clutch plates of the input and output sides when the rotational speed of the output member has exceeded that of the input member. According to this power transmitting apparatus, two cams are formed by providing gradient on each engaging surface of a clutch housing and a driving clutch plate. Thus, both the driving and driven clutch plates are strongly pressure-contacted by one pair of cams (pressure-contact assist cams) during the normal power transmission. On the contrary, the driving clutch plates are moved by the other pair of cams (back-torque limiting cams) toward a direction where the pressure-contact between the driving and driven clutch plates is released when back-torque is present.

However in the power transmitting apparatus of the prior art, since the gradient angles of the two cams (pressure-contact assist cams and back-torque limiting cams) are the same to each other, the described below problem exists. In order to firmly avoid trouble (locking of wheel) due to back-torque, it is preferable to set the gradient angle of the back-torque limiting cams as large as possible. This separates the driving clutch plates and the driven clutch plates away from each other as much as possible. Meanwhile, if the gradient angle of the pressure-contact assist cams is set large, cam surfaces of the pressure-contact assist cams and back-torque limiting cams interfere with each other due to the "wedge effect". Thus, the driving force cut-off operation cannot be carried out effectively. In addition, if the gradient angle of the pressure-contact assist cams is set too large, the bearing pressure between the driving and driven clutch plates would be remarkably different from that originally set at the designed time and thus the operability would also be reduced.

SUMMARY OF THE INVENTION

It is, therefore, an object of the present invention to provide a power transmitting apparatus which avoids the above mentioned problem and thus can always effectively perform the driving force cut-off operation.

According to the present invention, a power transmitting apparatus comprises a clutch housing with a plurality of driving clutch plates rotatable together with an input member. A clutch member is connected to an output member. The clutch member has a plurality of driven clutch plates alternately arranged between the driving clutch plates of the clutch housing. A rotational force inputted to the input member can be transmitted to or cut-off from the output member via pressure-contact or release between the driving clutch plates and driven clutch plates. The clutch member includes pressure-contact assist cams to increase the pressure-contacting force between the driving clutch plates and driven clutch plates when transmission of the rotational force inputted to the input member to the output member is achieved. Back-torque limiting cams release the connection between the driving clutch plates and the driven clutch plates when the rotational speed of the output member exceeds that of the input member. The gradient angle of the back-torque limiting cams is larger than the gradient angle of the pressure-contact assisting cams.

The power transmitting apparatus further comprises a pressure plate mounted on the clutch member. The pressure plate is moveable in an axial direction of the clutch member to carry out the pressure-contact or release of the driving clutch plates and the driven clutch plates, via the axial movement of the pressure plate relative to the clutch member. Stopper portions project toward the clutch member from the pressure plate. The stopper portions are fitted in recesses formed on the inner circumferential surface of the clutch member to limit the rotation of the pressure plate relative to the clutch member. The pressure-contact assist cams and the back-torque limiting cams are formed on the recesses of the clutch member and on the stopper portions of the pressure plate.

According to the present invention, since the gradient angle of the back-torque limiting cams is larger than the gradient angle of the pressure-contact assist cams, it is possible to avoid the above-mentioned problem and thus to always effectively perform the driving force cut-off operation.

According to the present invention, since the pressure-contact assist cams and the back-torque limiting cams are formed by the recesses formed on the clutch member and the stopper portions, which are conventionally provided in the power transmitting apparatus of the prior art, no additional parts are required to achieve the present invention. Thus, manufacturing cost, number of parts, and structure of the power transmitting apparatus can be reduced.

Further areas of applicability of the present invention will become apparent from the detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

A preferred embodiment of the present invention will be hereinafter described with reference to accompanied drawings.

Figure 1:
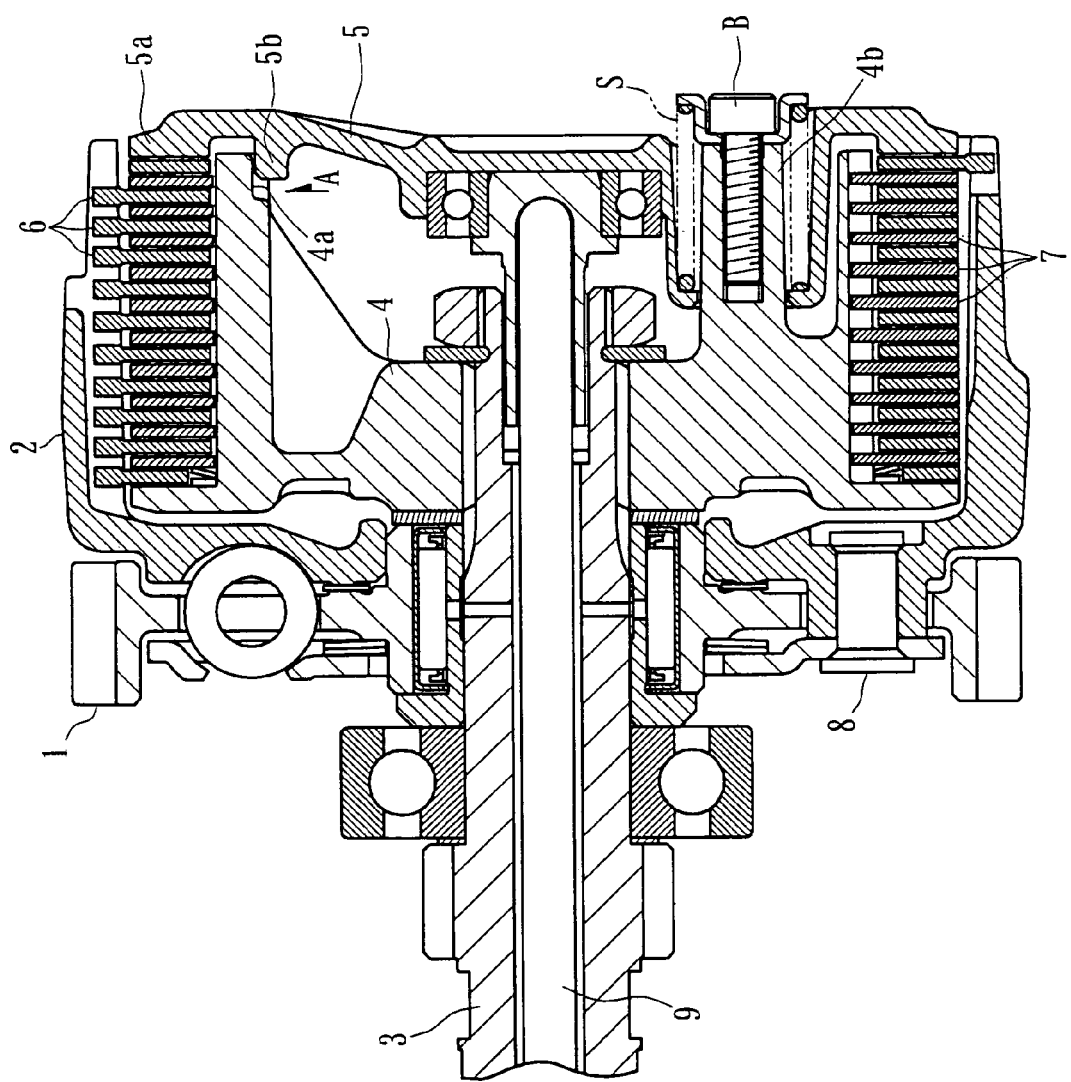
FIG. 1 is a longitudinal section view of a power transmitting apparatus of the present invention.

A power transmitting apparatus of a first embodiment of the present invention is mounted on a vehicle or motorcycle to arbitrarily transmit or cut-off the driving force of an engine and transmission to or from the front wheels. As shown in FIG. 1, the power transmitting apparatus of the present invention includes a clutch housing 2 with a gear 1 as an input member. A clutch member 4, connected to a shaft 3, acts as an output member. A pressure plate 5 is mounted on the clutch member 4 at the right end (in view of FIG. 1). Driving clutch plates 6 are connected to the clutch housing 2. Driven clutch plates 7 are connected to the clutch member 4.

The gear 1 is rotated around the shaft 3 by a driving force (rotational force) transmitted from the engine. The gear 1 is connected to the clutch housing 2 via rivets 8 etc. The clutch housing 2 is a cylindrical casing member opened at its right end. The clutch housing 2 includes a plurality of driving clutch plates 6 on its inner circumferential surface. Each of the driving clutch plates 6 is formed as a substantially annular plate member and is rotated together with the clutch housing 2.

The clutch member 4 is formed as a cylindrical casing member opened at its right end. The clutch member 4 is adapted to be received within the clutch housing 2. The shaft 3 passes through the center of the clutch member 4 and is connected via a spline connection. Thus, the shaft 3 is rotated by the clutch member 4. Axially extending splines are formed on the outer circumferential surface of the clutch member 4. The driven clutch plates 7 are fitted on the splines.

The driven clutch plates 7 are alternately arranged between the driving clutch plates 6. Thus, clutch plates 6 and 7 are adjacent each other and can be pressure-contacted or released. Accordingly, both clutch plates 6 and 7 are allowed to be slid axially of the clutch member 4. The clutch plates 6 and 7 pressure-contact each other when they are pushed by the pressure plate 5 toward a left direction (in view of FIG. 1). Thus, the rotational force can be transmitted to the clutch member 4 and the shaft 3. When the pressure plate 5 is released, the clutch plates 6 and 7 release each other and the clutch member 4 cannot follow the rotation of the clutch housing 2. Accordingly, the clutch member 4 is stopped so that power cannot be transmitted to the shaft 3.

In this case, it should be noted that "release" of the clutch plates 6 and 7 means a condition where the pressure-contact is lost. Thus, the clutch member 4 does not follow the rotation of the clutch housing 2 (a condition where the driving clutch plates 6 slide on the driven clutch plates 7) and thus it is out of the question whether there is any clearance between the clutch plates 6 and 7.

The pressure plate 5 has an overall disc configuration, such as closing the opening (the right end) of the clutch member 4, and is normally urged toward a left direction by the clutch spring S. The urging of the pressure plate 5 is achieved by the clutch spring S arranged between a boss portion 4b, projecting from the clutch member 4 and extending through the pressure plate 5, and a head of a clutch bolt B, screwed into the boss portion 4b.

Thus the circumferential edge portion 5a of the pressure plate 5 abuts the clutch plate 7 positioned at the right most position. The clutch plates 6 and 7 are normally pressure-contacted toward each other by the clutch spring S. Accordingly, the clutch housing 2 and the clutch member 4 are kept in a normally connected condition. Thus, the gear 1 can rotate the shaft 3 when the rotational force is inputted to the gear 1.

The pressure-contact force between the driving and driven clutch plates 6 and 7 can be released when a vehicle driver operates or moves a push rod 9 toward a right direction (in view of FIG. 1). This moves the pressure plate 5 towards a right direction against the urging force of the clutch spring S. When the pressure-contacting force between the driving and driven clutch plates 6 and 7 is released, the rotational force inputted to the gear 1 and the clutch housing 2 is cut-off and thus is not transmitted to the shaft 3. Thus, the pressure-contact or the release between the plates 6 and 7 can be achieved by the axial movement of the push rod 9 and, accordingly, the pressure plate 5.

The pressure plate 5 is formed with several projecting stopper portions 5b to limit rotation of the pressure plate 5 relative to the clutch member 4. Each stopper portion 5b has a projected configuration and is fit into a recess 4a formed on the inner circumferential surface of the clutch member 4 to limit the relative rotation between the pressure plate 5 and the clutch member 4.

Figure 2:
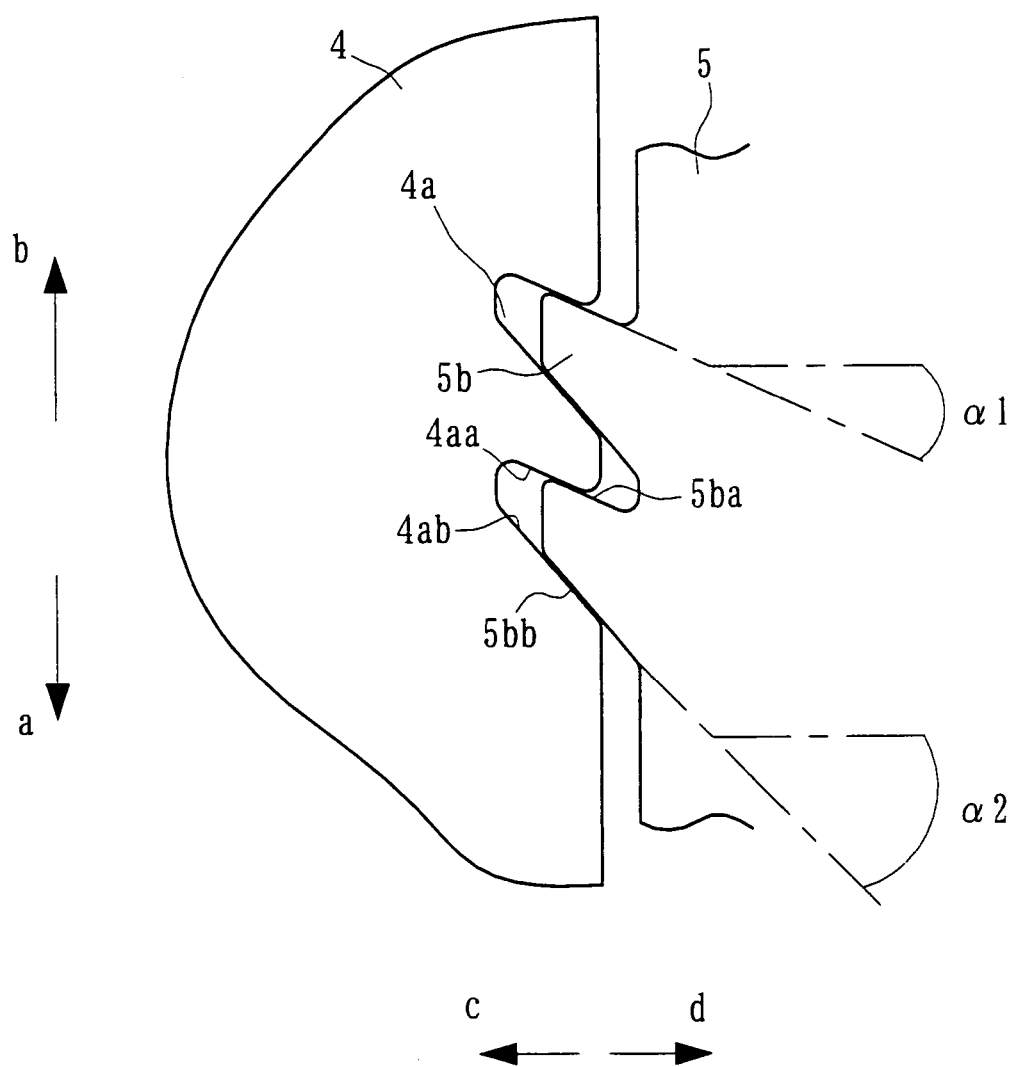
FIG. 2 is a schematic view of a region near the stopper portions and recesses taken in a direction of an arrow A in FIG. 1.

Referring to FIG. 2, the stopper portions 5b of the pressure plate 5 are formed with cam surfaces 5ba and 5bb. Each cam surface 5ba has a gradient angle $\alpha 1$. Cam surfaces 5bb have a gradient angle $\alpha 2$. On the other hand, the recesses 4a of the clutch member 4 are formed with cam surfaces 4aa, 4ab. Each cam surface 4aa has a gradient angle $\alpha 1$. Cam surfaces 4ab each have a gradient angle $\alpha 2$. Each of these gradient angles is defined as an angle of each cam surface measured relative to a horizontal line (direction of the axis of the clutch member 4 and the pressure plate 5). The gradient angle $\alpha 2$ is set to be larger than the gradient angle $\alpha 1$. Angle $\alpha 1$ is about 25° and angle $\alpha 2$ is about 50°.

Each pair of mutually contacting cam surfaces 5ba and 4aa are arranged to form the pressure-contact assist cam. The other pair of mutually contacting cam surfaces 5bb and 4ab forms the back-torque limiting cam. Thus, when the rotational force inputted to the gear 1 and the clutch housing 2 is transmitted to the shaft 3, via the clutch member 4, the rotational force, in a direction shown by Arrow "a" in FIG. 2, is applied to the clutch member 4. Accordingly, when the pressure plate 5 is moved toward a direction shown by Arrow "c", the camming action of the pressure-contact assist cams and thus the pressure-contact force between the driving and driven clutch plates 6 and 7 can be increased.

On the other hand, when back-torque is caused in a direction shown by an arrow "b", if the rotation speed of the shaft 3 exceeds that of the gear 1 and the clutch housing 2, the pressure plate 5 is moved toward a direction shown by arrow "d". Thus, the driving and driven clutch plates 6 and 7 are released. Accordingly, trouble caused by the back-torque in the power transmitting apparatus or power unit (an engine) can be avoided.

Since the gradient angle $\alpha 2$ of the back-torque limiting cams, pair 4ab and 5bb, is larger than the gradient angle $\alpha 1$ of the pressure-contact assist cams, pair 4aa and 5ba, it is possible to set the shift in direction "d" of the pressure plate 5 (function as a back-torque limiter) larger than the shift in direction "c" of the pressure plate 5 (function as a pressure-contact assist). Thus, it becomes possible to avoid trouble caused by the back-torque and to always effectively perform the driving force cut-off operation of the clutch due to less generation of the so-called wedge effect.

According to the present invention, since the pressure-contact assisting cams or the back-torque limiting cams are arranged respectively at the recesses 4*a* on the inner circumferential wall of the clutch member 4 and the stopper portions 5*b*, it is possible to reduce the surface pressure applied to the cam surfaces. This avoids the excessive load which would be otherwise applied, as compared with the prior art where the cam members have such function and are arranged near the shaft 3. Accordingly, it is possible to eliminate any new additional parts made, for example, as a forged member. Thus, this reduces the manufacturing cost, the number of the parts. In addition, it is possible to reduce the size of the power transmitting apparatus in view of its transmissible torque (i.e. a ratio of size/transmissible torque).

According to the power transmitting apparatus of the present invention, it is possible to obtain the pressure-contact assist function and the back-torque limiting function by only changing the configuration of the stopper portions and the recess, which receive the stopper portions, of the prior art. Furthermore, since the stopper portions of the prior art also exhibit a function to preventing rotation of the pressure plate 5 and the stopper portions are made to have a relatively high rigidity, no other process to increase the rigidity is required. Accordingly, the present invention can be easily applied to the power transmitting apparatus of the prior art.

In addition, it is preferable, to improve the wear resistance and the durability, to provide a surface treatment on the cam surfaces 5*bb* and 4*ab* that form the pressure-contact assisting cams and cam surfaces 5*ba* and 4*aa* which form the back-torque limiting cams. The surface treatment may include chrome plating and anode oxide coating etc. A surface treatment can improve slidability of the cam surfaces to achieve a good camming action as well as to prevent generation of abrasion on the cam surfaces to extend the life of the power transmitting apparatus.

Although it may be possible to provide the surface treatment to the entire clutch member 4 and pressure plate 5, the surface treatment need only be on the cam surfaces to be sufficient. Also, the surface treatment may be provided on either one of the pressure-contact assisting cams or the back-torque limiting cams.

Although the present invention has been described with reference to the preferred embodiment, the present invention is not limited to the illustrated explanations. For example, the present invention can be applied to an arrangement where the pressure-contact assisting cams and the back-torque limiting cams are formed on parts other than the clutch member and the pressure plate, for example, on positions between the clutch housing and the driving clutch plates or between the clutch member and the driven clutch plates etc. This is achieved as long as it is constructed that the gradient angle of the back-torque limiting cams is larger than that of the pressure-contact assisting cams. The power transmitting apparatus of the present invention can be applied to a power transmitting apparatus of multiple disc clutch type used for a three or four wheeled buggy, machines for multiple use other than for a motorcycle.

The power transmitting apparatus of the present invention can be applied to apparatus having different outline configurations or additional functions as long as they have pressure-contact assisting cams and back-torque limiting cams as well as a gradient angle on the back-torque limiting cams larger than that of the pressure-contact assisting cams.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A power transmitting apparatus comprising:
   a clutch housing rotatable together with an input member having a plurality of driving clutch plates;
   a clutch member connected to an output member having a plurality of driven clutch plates alternately arranged between the driving clutch plates of the clutch housing;
   a rotational force inputted to the input member can be transmitted to or cut-off from the output member via pressure-contact or release between the driving clutch plates and driven clutch plates;
   said clutch member includes pressure-contact assisting cams, when a transmission condition of rotational force inputted to the input member to the output member is achieved, said assisting cams increasing the pressure-contacting force between the driving clutch plates and driven clutch plates, said clutch member also including back-torque limiting cams, when the rotational speed of the output member exceeded that of the input member, said torque limiting cams releasing the connection between the driving clutch plates and the driven clutch plates, and a gradient angle of the back-torque limiting cams is formed larger than a gradient angle ($\alpha 1$) of the pressure-contact assisting cams.

2. A power transmitting apparatus of claim 1 further comprising:
   a pressure plate mounted on the clutch member and moveable in an axial direction of the clutch member for carrying out the pressure-contact or release of the driving clutch plates and the driven clutch plates via the axial movement of the pressure plate relative to the clutch member; and
   stopper portions projected toward the clutch member from the pressure plate and are fitted in recesses formed on the inner circumferential surface of the clutch member for limiting the rotation of the pressure plate relative to the clutch member;
   said pressure-contact assist cams and the back-torque limiting cams are formed on the recesses of the clutch member and on the stopper portions of the pressure plate.

3. A power transmitting apparatus of claim 2, wherein the gradient angle ($\alpha 2$) of the back-torque limiting cams, from a direction of the axis of the clutch member and the pressure plate, is set to be 50° and the gradient angle ($\alpha 1$) of the pressure-contact assisting cams, from a direction of the axis of clutch member and the pressure plate, is set to be 25°.

4. A power transmitting apparatus of claim 1, wherein a surface treatment is provided on the cam surfaces forming the pressure-contact assisting cams and cam surfaces forming the back-torque limiting cams.

5. A power transmitting apparatus of claim 4, wherein the surface treatment may include a chrome plating, anode oxide coating or their equivalents.

* * * * *